United States Patent [19]

Dürschinger

[11] Patent Number: 5,137,396
[45] Date of Patent: Aug. 11, 1992

[54] CUTOFF TOOL

[75] Inventor: Hans Dürschinger, Fürth, Fed. Rep. of Germany

[73] Assignee: Hertel AG Werkzeuge+Hartstoffe, Fürth, Fed. Rep. of Germany

[21] Appl. No.: 688,593

[22] PCT Filed: Nov. 17, 1990

[86] PCT No.: PCT/DE90/00883
§ 371 Date: Jun. 27, 1991
§ 102(e) Date: Jun. 27, 1991

[87] PCT Pub. No.: WO91/08071
PCT Pub. Date: Jun. 13, 1991

[30] Foreign Application Priority Data

Nov. 23, 1989 [DE] Fed. Rep. of Germany ....... 8913805

[51] Int. Cl.$^5$ ............................................. B27B 27/04
[52] U.S. Cl. ..................................... 407/117; 407/116
[58] Field of Search ................................. 407/115-117

[56] References Cited

U.S. PATENT DOCUMENTS

| | | | |
|---|---|---|---|
| 2,688,791 | 9/1954 | Luers et al. | 407/115 |
| 4,776,733 | 10/1988 | Pettersson | 407/117 X |
| 4,778,311 | 10/1988 | Niemi | 407/117 X |
| 5,076,739 | 12/1991 | Pano | 407/117 X |

FOREIGN PATENT DOCUMENTS

| | | |
|---|---|---|
| 381263 | 9/1986 | Austria . |
| 0241973 | 10/1987 | European Pat. Off. . |
| 0245225 | 11/1987 | European Pat. Off. . |
| 2145291 | 1/1973 | France . |
| 831388 | 5/1981 | U.S.S.R. . |
| 299875 | 10/1928 | United Kingdom . |

Primary Examiner—Steven C. Bishop
Attorney, Agent, or Firm—Spencer, Frank & Schneider

[57] ABSTRACT

A groove cutter (1) has a groove cutting edge (3) that is inclined at a lead angle ($\kappa$). The groove cutting edge (3) has a hollowed-out center region (11) between end regions (9, 10) on both sides, and connection cutting edges (15, 16) provide transitions between the center region (11) and the end regions (9, 10). The connection cutting edges (15, 16) have different lengths and are disposed with respect to one another at a flank angle ($\delta$). The groove cutter (1) also has a cutting edge corner (7) that leads in a groove cutting direction (5), along with a cutting edge corner (8) that trails in the groove cutting direction (5). One of the connection cutting edges (15) is disposed adjacent to the leading cutting edge corner (7) and forms an inclination angle ($\alpha$) with respect to an adjacent end region cutting edge (12). This angle of inclination ($\alpha$) is greater than an oppositely directed inclination angle ($\beta$) between the other connection cutting edge (16) and another end region cutting edge (13), which trails in the groove cutting direction.

18 Claims, 3 Drawing Sheets

CUTOFF TOOL

BACKGROUND OF THE INVENTION

The invention relates to a cutoff tool, and more particularly to a cutter of the type having a flank and a cutting face which are adjacent a groove cutting edge, with the flank being disposed at an angle near 90° with respect to the vertical longitudinal center plane of the cutter and providing a lead angle ($\kappa$) in the plane of the cutting face. A cutter of this type is made of hard cutting material and is intended to be releasably fixed in a holder in such a manner that the vertical longitudinal center plane of the cutter extends in a groove cutting feed direction. Such cutters may be employed, for example, as cutting tools or milling cutters. In their configuration according to the invention they serve primarily to cut off the ends of workpieces.

Cutoff tools should ensure the flattest possible surface at the end of the cut-off component or workpiece from which a piece has been cut off. The lead angle $\kappa$ of the cutting edge serves to prevent remainders of the material, for example, in the form of a remaining hump at an end face formed by the groove cutting movement. The lead angle $\kappa$, however, generates a deflecting pressure $F_p$ which acts on the groove cutting edge and on the cutoff tool. This pressure urges the tool out of its centered position, approximately in the longitudinal direction of the groove cutting edge. This may lead to a rather spherical or hollowed-out surface configuration instead of the desired planar end face.

It is already known to compensate for the deflecting pressures acting on the leading corner of the groove cutting edge by configuring the groove cutting edge so that it ascends in the direction toward the trailing cutting edge corner. This generates a pressure component $F_p'$ which acts in the direction toward the cutting edge corner that trails during the groove cutting process.

SUMMARY OF THE INVENTION

It is an object of the invention to create a cutoff tool of the above-mentioned type which, on the one hand, compensates for the deflecting pressure resulting from the lead angle ($\kappa$) of the groove cutting edge but, on the other hand, also enhances chip formation in the cut groove in the sense of easy and reliable chip removal. This can be accomplished by providing a cutter of the above-mentioned type which is characterized in that the groove cutting edge includes a hallowed-out center region between two end regions, the end regions having end region cutting edges and the center region having a central region cutting edge that is essentially parallel to the end region cutting edges; in that the groove cutting edge also has connecting cutting edges between the central region cutting edge and the end region cutting edges, the connecting cutting edges being disposed at a flank angle ($\delta$) with respect to one another; and in that one of the end region outting edges leads in a groove cutting feed direction and the other end cutting edge trails in the groove cutting feed direction, one of the connection cutting edges being disposed adjacent the leading end region cutting edge and forming an angle of inclination ($\alpha$) with respect to it, the other connection cutting edge being disposed adjacent the trailing end region cutting edge and forming angle of inclination ($\beta$) with respect to it, the angle of inclination ($\alpha$) being larger than the angle of inclination ($\beta$) and being oppositely directed to the angle of inclination ($\beta$). The angle of inclination ($\alpha$) preferably has a magnitude such that an outgoing chip remains essentially out of contact with a flank cutting face that is inclined at the angle of inclination ($\alpha$), while the angle of inclination ($\beta$) is dimensioned so that the outgoing chip remains in contact with a flank cutting face that is inclined at an angle of inclination ($\beta$).

The concept of the invention is that, in contrast to prior art cutoff tools of the above-mentioned type, no continuous, straight cutting edge exists, and also that the cutting edge does not ascend toward the cutting corner trailing in the groove cutting direction. Instead, the cutting edge has an essentially horizontal position which, for a cutoff tool, lies approximately in the horizontal plane defined by the workpiece axis. A compensatory pressure that counteracts the deflecting pressure acting in the direction toward the leading cutting edge corner is generated since the outgoing chip essentially contacts only the flank cutting face adjacent the trailing cutting corner and thus provides a compensation pressure $F_p'$ which counteracts the deflecting pressure $F_p$.

The compensation pressure $F_p'$ counteracting the deflecting pressure $F_p$ may also be supported by configuring the cutter so that it has a cutting edge corner that leads in the groove cutting feed direction and a cutting edge corner that trails in the groove cutting feed direction the leading cutting edge corner having a corner radius that is greater than the corner radius of the trailing cutting edge corner.

The groove cutting edge of the tool according to the invention is distinguished by a positive rake angle. As customary, the groove cutting edge may be chamfered over its entire length.

DESCRIPTION OF THE PREFERRED EMBODIMENT

Figure 1:
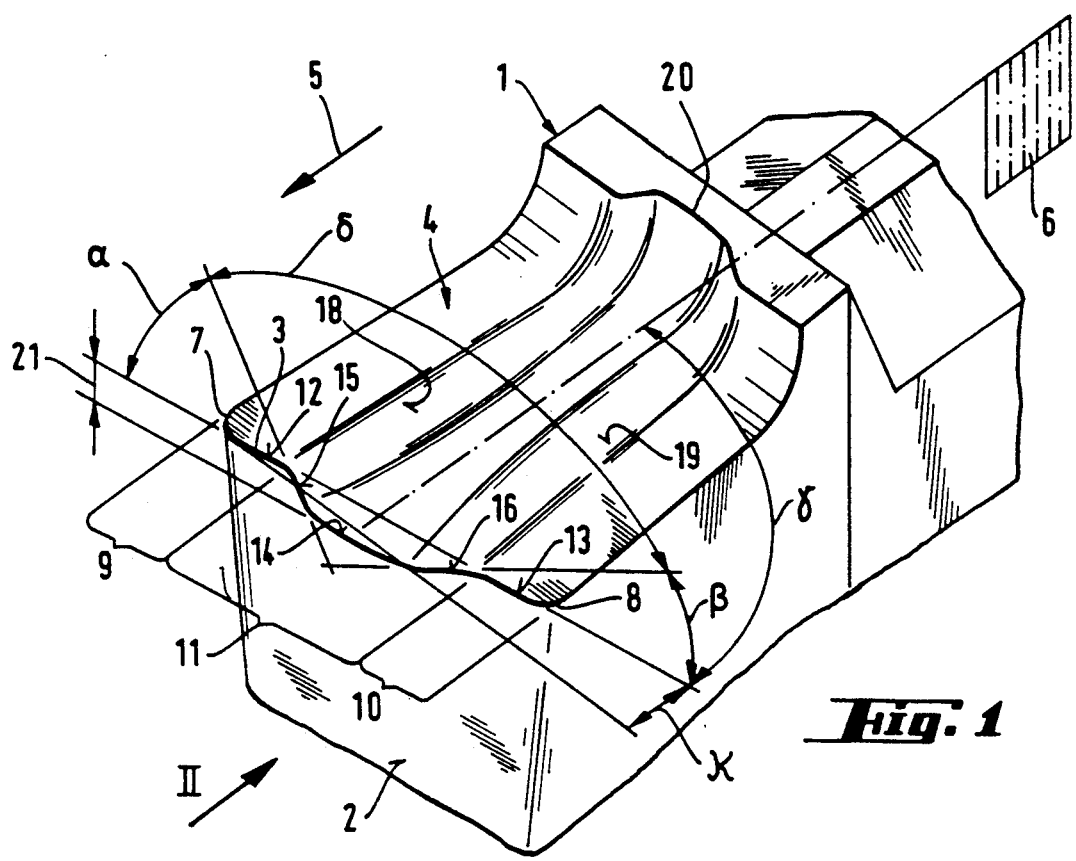
FIG. 1 is a perspective view, partially broken away, of the front end on the side of the groove cutting edge of a cutter intended for a cutoff tool.

A cutter 1 in accordance with the invention has a flank 2 and a groove cutting edge that is marked 3 as a whole. A cutting face 4 is disposed adjacent groove cutting edge 3. In order to form a lead angle $\kappa$ in the plane of the cutting face 4, the flank 2 encloses an angle $\gamma$ of almost 90° with respect to the vertical longitudinal center tool plane 6. Plane 6 extends in a groove cutting feed direction 5.

Cutter 1 also has a cutting edge corner 7 that leads in groove cutting feed direction 5 and a cutting edge corner 8 that trails in the groove cutting feed direction. Groove cutting edge 3 has an end region 9 adjacent cutting edge corner 7, an end region 10 adjacent cutting edge corner 8, and a hollowed-out center region 11 with a center region cutting edge 14 which is essentially parallel to two end region cutting edges 12 and 13.

Figure 2:
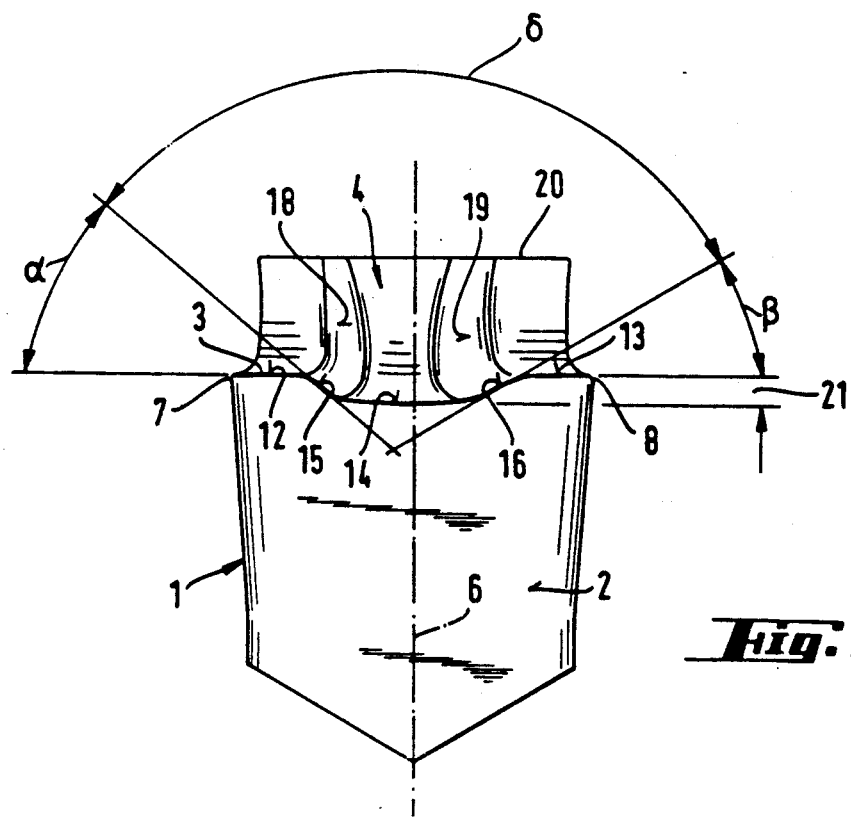
FIG. 2 is a front view of the cutter, seen in the direction of arrow II of FIG. 1.
Figure 4:
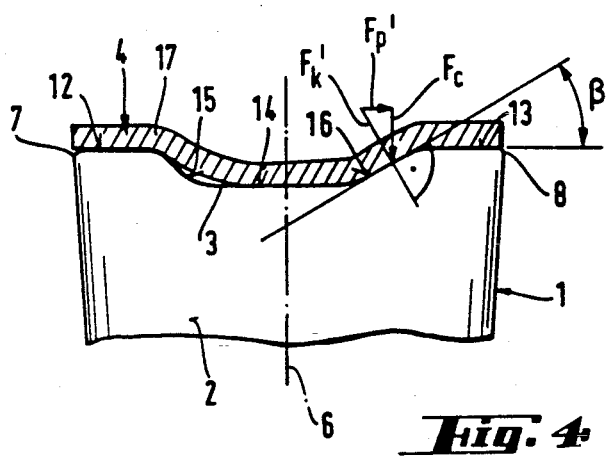
FIG. 4 is a schematic front view of the groove cutting edge, seen approximately in the direction of arrow II of FIG. 1, with a schematically indicated sectional view of the outgoing chip and its guidance by the cutting face of the groove cutting edge.
Figure 5:
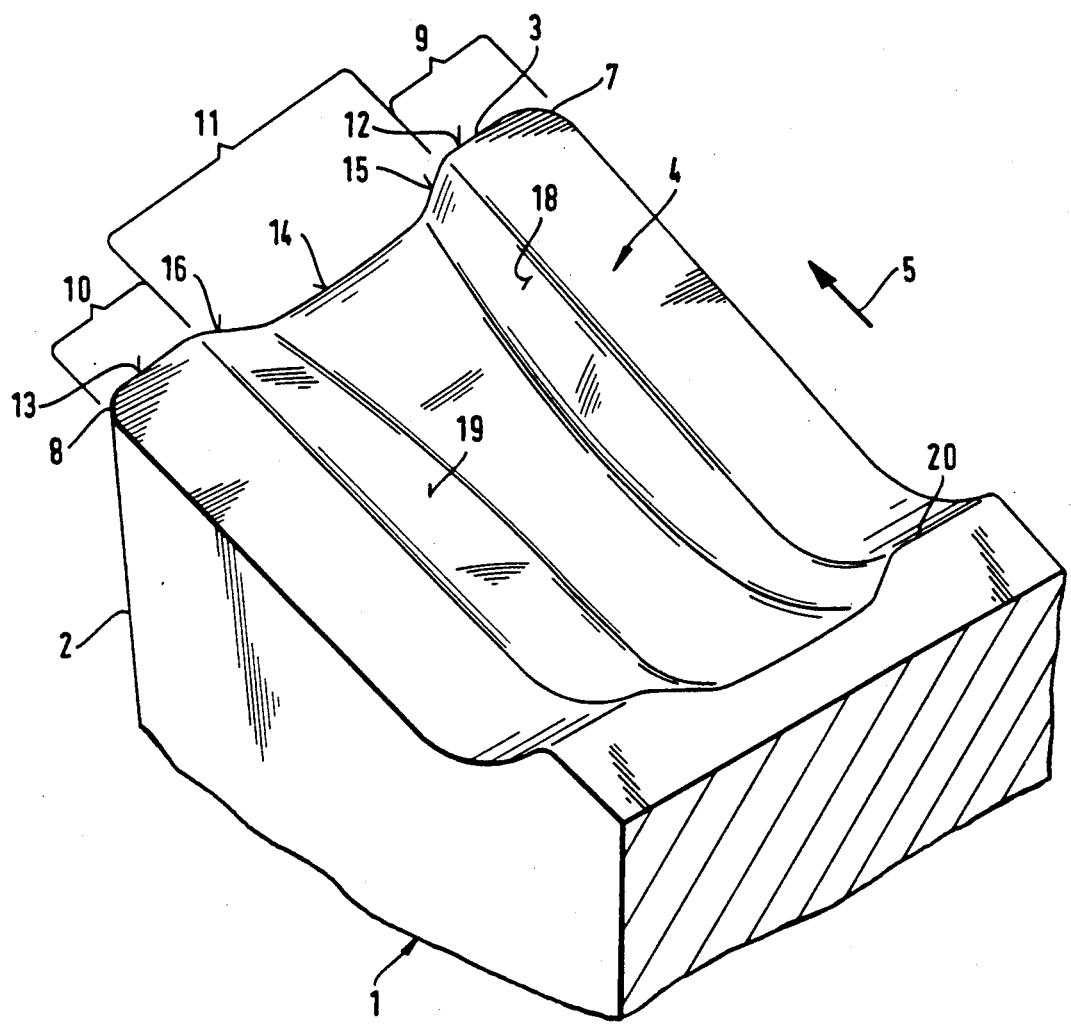
FIG. 5 is a perspective plan view of the cutter, partially broken away, seen obliquely from the rear.

Connection cutting edges 15 and 16 are provided between the center region cutting edge 14 and the end region cutting edges 12 and 13. The connection cutting edges 15 and 16 form a flank angle δ that closes toward center region cutting edge 14. The connection cutting edge 15 forms an angle of inclination α with the adjacent end region cutting edge 12. This angle is greater than the oppositely directed inclination angle β between the other connection cutting edge 16 and the end region cutting edge 13. The inclination angle α is dimensioned so that the outgoing chip 17 (FIG. 4) remains essentially without contact with the flank cutting face 18 (which is inclined at inclination angle α), while the oppositely directed inclination angle β (FIG. 2) is dimensioned so that the outgoing chip 17 remains in contact with the mating flank cutting face 19.

The flank angle δ between the two connection cutting edges 15 and 16 is an obtuse angle. The difference between inclination angle α and oppositely directed inclination angle β is about 7°–13°, and preferably about 10°. The inclination angle α is about 40° and the oppositely directed inclination angle β is about 30°. The two end region cutting edges 12 and 13 each amount to about 15%–30% of the cutting width, and preferably about 18%–21%.

The cross-sectional shape of the entire cutting face 4 essentially coincides with the shape of groove cutting edge 3. In practice, this means that the shape of groove cutting edge 3 continues in the chip discharge direction, that is, the direction opposite to groove cutting feed direction 5, over the entire cutting face 4. In the chip discharge direction, cutting face 4 changes into a chip breaker groove 20. The transition from cutting face 4 to chip breaker groove 20 extends upwardly approximately in the shape of an arc segment. The two end region cutting edges 12, 13 and the center region cutting edge 14 together form more than 50%, preferably more than 70%, of the cutting width.

Figure 3:
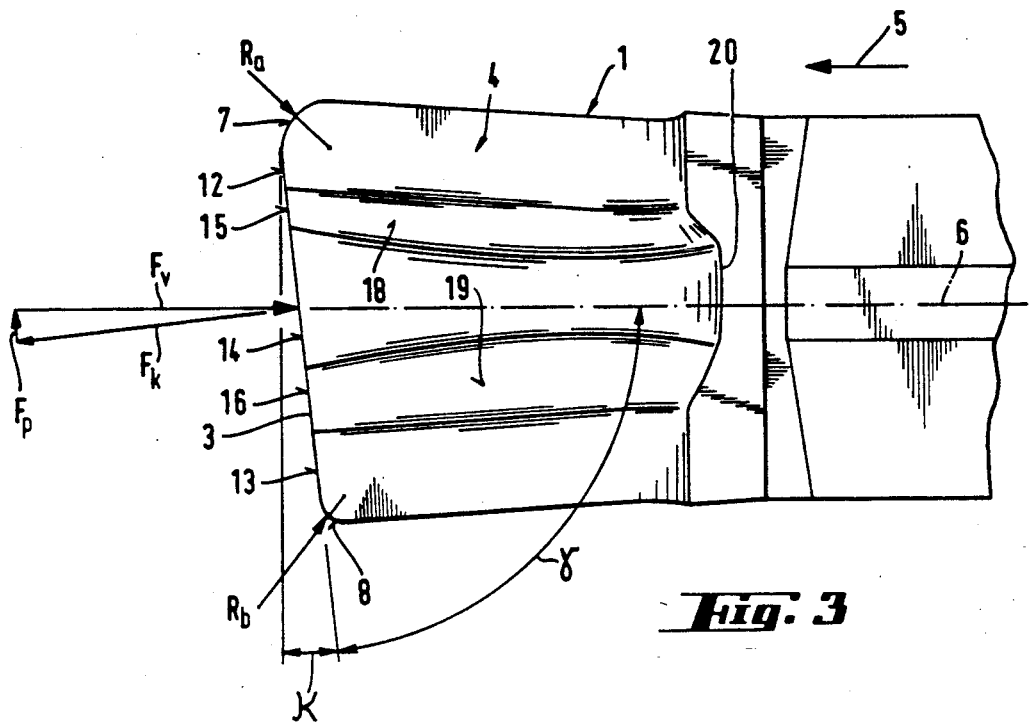
FIG. 3 is a vertical plan view, partially broken away, of the cutter according to the invention.

The corner radius $R_a$ of the cutting edge corner 7, which leads in groove cutting feed direction 5, is greater than the radius $R_b$ of the opposite corner at the trailing cutting edge corner 8 (FIG. 3).

The rake angle between cutting face 4 and flank face 2 is an acute angle. Groove cutting edge 3 and its individual components (that is, end region cutting edges 12 and 13; center region cutting edge 14; and connection cutting edges 15 and 16) are rounded and the transitions between them are filleted. The depth dimension 21 of center region cutting edge 14 relative to end region cutting edges 12 and 13 is between about 6% and 9% of the groove cutting width, with 9% being associated with the smallest groove cutting width and 6% with the largest. The groove cutting widths generally lie between about 2 and about 6 mm. The lead angle κ may lie between 1° and 15°. In the embodiment discussed, a lead angle of about 6° has been selected and the remaining dimensions are based on this.

What is claimed is:

1. A cutoff tool for machining a workpiece while the cutting tool is releasably fixed in a holder and moved in a groove cutting feed direction, comprising:
   an element having a vertical longitudinal center plane which extends parallel to the groove cutting feed direction, the element additionally having a groove cutting edge and a flank which extends from the groove cutting edge, the flank being disposed at an angle of almost 90° with respect to the vertical longitudinal center plane to provide a predetermined lead angle (κ),
   wherein the groove cutting edge has a first end region with a first end region cutting edge and a second end region with a second end region cutting edge, a hollowed-out center region with a central region cutting edge, the central region cutting edge being disposed between the end region cutting edges and being essentially parallel to the end region cutting edges, a first connection cutting edge between the first end region cutting edge and the central region cutting edge, and a second connection cutting edge between the second end region cutting edge and the central region cutting edge,
   wherein the first end region cutting edge leads the second end region cutting edge in the groove cutting feed direction and, correspondingly, the second end region cutting edge trails the first end region cutting edge in the groove cutting feed direction,
   wherein the first and second connection cutting edges are disposed at a predetermined flank angle (δ) with respect to one another,
   wherein the first connection cutting edge is disposed at a first angle of inclination (α) with respect to the first end region cutting edge and the second connection cutting edge is disposed at a second angle of inclination (β) with respect to the second end region cutting edge, the first and second angles of inclination being oppositely directed, and
   wherein the first angle of inclination is larger than the second angle of inclination.

2. The cutoff tool of claim 1, wherein the element additionally has a first flank cutting face that extends from the first connection cutting edge and a second flank cutting face that extends from the second connection cutting edge, the first flank cutting face being inclined at the first angle of inclination and the second flank cutting face being inclined at a second angle of inclination, wherein the first angle of inclination has a magnitude such that an outgoing chip cut from the workpiece is essentially kept out of contact with the first flank cutting face, and wherein the second angle of inclination has a magnitude such that the outgoing chip contacts the second flank cutting face.

3. The cutoff tool of claim 1, wherein the flank angle is an obtuse angle.

4. The cutoff tool of claim 1, wherein the difference between the first and second angles of inclination ranges from about 7° to about 13°.

5. The cutoff tool of claim 4, wherein the difference between the first and second angles of inclination is about 10°.

6. The cutoff tool of claim 4, wherein the first angle of inclination is about 40° and the second angle of inclination is about 30°.

7. The cutoff tool of claim 1, wherein the groove cutting edge provides a predetermined groove cutting width, wherein the first end region cutting edge has a length ranging from about 15% to about 30% of the groove cutting width, wherein the second end region cutting edge has a length ranging from about 15% to about 30% of the groove cutting width, and wherein the lengths of the first and second end region cutting edges are approximately equal.

8. The cutoff tool of claim 7, wherein the length of the first end region cutting edge ranges from about 18%-21% of the groove cutting width, and wherein the length of the second end region cutting edge ranges from about 18%-21% of the groove cutting width.

9. The cutoff tool of claim 1, wherein the element additionally has an uneven cutting face with portions extending from the first end region cutting edge, the first connection cutting edge, the central region cutting edge, the second connection cutting edge, and the second end region cutting edge, the uneven cutting face having a cross-sectional shape that essentially coincides with the shape of the groove cutting edge.

10. The cutoff tool of claim 9, wherein the uneven cutting face has an end at the groove cutting edge and another end remote from the groove cutting edge, the uneven cutting face curving to provide a chip breaker groove adjacent the another end.

11. The cutoff tool of claim 10, wherein the curve of the uneven cutting face is shaped as an arc segment.

12. The cutoff tool of claim 1, wherein the groove cutting edge provides a predetermined groove cutting width, and wherein the first end region cutting edge, the central region cutting edge, and the second end region cutting edge have respective lengths whose sum is more than about 50% of the groove cutting width.

13. The cutoff tool of claim 12, wherein the sum of the lengths of the first and second end region cutting edges and the central region cutting edge is more than about 70% of the groove cutting width.

14. The cutoff tool of claim 1, wherein the element additionally has a rounded first corner adjacent the first end region cutting edge and a rounded second corner adjacent the second end region cutting edge, the first and second corners having respective corner radii, and wherein the corner radius of the first corner is greater than the corner radius of the second corner.

15. The cutoff tool of claim 1, wherein the groove cutting edge has a predetermined rake angle, the rake angle of the groove cutting edge being positive.

16. The cutoff tool of claim 1, wherein the groove cutting edge has a rounded transition between the first end region cutting edge and the first connection cutting edge, a rounded transition between the first connection cutting edge and the central region cutting edge, a rounded transition between the central region cutting edge and the second connection cutting edge, and a rounded transition between the second connection cutting edge and the second end region cutting edge.

17. The cutoff tool of claim 1, wherein the groove cutting edge provides a predetermined groove cutting width, wherein the central region cutting edge has a predetermined depth with respect to the end region cutting edges, and wherein the depth of the central region cutting edge ranges from about 6%-9% of the groove cutting width, with 9% being associated with a small groove cutting width and 6% being associated with a large groove cutting width.

18. The cutoff tool of claim 1, wherein the lead angle ($\kappa$) is about 6°.

* * * * *